2,971,952

POLYMERIZATION OF ETHYLENICALLY UNSATURATED COMPOUNDS WITH ORGANIC HYPONITRITE CATALYSTS

John Woolley Batty, Arthur Lambert, and Gerald Scott, Blackley, Manchester, and Frank Bebbington and Leslie Seed, Northwich, England, assignors to Imperial Chemical Industries Limited, London, England, a corporation of Great Britain No Drawing. Filed Oct. 7, 1957, Ser. No. 688,416

Claims priority, application Great Britain May 2, 1956

11 Claims. (Cl. 260—94.9)

This invention relates to the polymerisation of ethylenically unsaturated compounds and more particularly to the use of certain organic hyponitrites as catalysts.

It has already been proposed, in Specifications Nos. 618,168, now U.S. Patent 2,809,787, and 22,444/55, to use bis-alkyl, -allyl or -benzyl hyponitrites in the polymerisation of ethylenically unsaturated compounds. We have now found that superior results are achieved by the use of certain organic hyponitrites as catalysts.

According to the present invention we provide a process for the polymerisation of ethylenically unsaturated compounds characterised in that as catalyst there is used at least one organic hyponitrite wherein the organic residue contains at least one ether oxygen atom, preferably on an alpha carbon atom.

The organic hyponitrites to be used as catalysts in the process of this invention have the formula

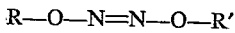

wherein R and R' stand for organic radicals containing at least one ether oxygen atom preferably on an alpha carbon atom and may be straight or branched chain and may contain cyclic or unsaturated groups. Furthermore R and R' and optionally the hyponitrous acid residue may form part of a ring system. These hyponitrites may be prepared in excellent yield by interaction between silver hyponitrite or other metal hyponitrite and a halide R-Hal (when monomeric compounds are obtained) or Hal-R-Hal (when polymeric compounds may be obtained), wherein R has the significance stated above, preferably in solution in any solvent which is compatible with the polymerisation process, for example ethers such as the diethyl ether of ethylene glycol, m-dioxane, paraffins such as white spirit, or liquid aromatic hydrocarbons and their simple halogen or oxygen derivatives such as benzene, xylene, chlorobenzene or anisole. Other solvents that may be used include volatile compounds and liquefied gases including ethylene and also other polymerisable monomers that are to be polymerised by means of the hyponitrite. Thus, if desired, the hyponitrite may be prepared in the presence of the monomer to be polymerised and then the system may be allowed to warm up to reaction temperature. In this way lower reaction temperatures can be used than when the hyponitrite is isolated. The reaction is controlled by external cooling of the reaction mixture, usually to a temperature of —20° C. to 10° C., preferably to below —10° C. When the reaction is finished, the silver halide may be removed by filtration. The so-obtained solution of the hyponitrite may be used as such in the polymerisation process or the hyponitrite may first be isolated by, for example, evaporation of the solvent at low temperature or by freezing to —80° C.; the pure hyponitrous esters are dangerous detonating explosives and isolation is usually avoided. Hyponitrites can be prepared from unstable halides which can be generated in situ.

As examples of hyponitrites for use in the process of this invention there may be mentioned esters (which may be polymeric) of the general structure

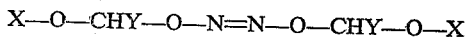

wherein X may be alkyl, alkoxyalkyl, cycloalkyl, or aryl and Y may be hydrogen, alkyl, cycloalkyl, aryl, alkoxy, alkoxyalkyl or may form part of a ring with X.

Those hyponitrites are preferred which contain the structure iso-amyl, n- or sec-octyl, 2:4:4-trimethylpentan-2-yl, 3:5:5-trimethylhexan-1-yl, dodecyl, cyclohexyl, etc. or stands for a difunctional group containing for example other or the same α-alkoxyalkyl hyponitrite group, α-chloroether groups, etc.; examples of such hyponitrites are those obtained from bis(halogenomethyl) ethers, etc. Also within this preferred class are tetrahydropyranyl and tetrahydrofuranyl hyponitrites.

Ethylenically unsaturated compounds that may advantageously be polymerised according to the process of this invention include, for example, ethylene, styrene, methyl methacrylate, vinyl acetate, butadiene and other monomers that are advantageously polymerised or co-polymerised at low temperature.

The polymerisation process may be performed in any conventional manner, with the use of the new catalyst. Thus for example it may be carried out at normal or elevated or reduced pressures or temperatures and, since the catalysts are very soluble in water as well as being soluble in organic media, they may be used in aqueous solutions or dispersions as effectively as in organic solutions.

The hyponitrites used as catalysts in the present invention are more effective than those hitherto proposed. Thus, for example, using bis-methoxymethyl hyponitrite in the polymerisation of ethylene at superatmospheric pressures and at elevated temperatures to give polythene, for equal rate of polymerisation under otherwise similar conditions the necessary reaction temperature is about 30° C. less than that required when isobutyl hyponitrite is used as catalyst. Alternatively, at a given reaction temperature these catalysts enable a much higher rate of polymerisation to be achieved. A similar increase in efficiency is observed in the polymerisation of other unreactive monomers such as vinyl acetate. The catalysts are particularly valuable when it is desired to obtain polythenes possessing greater stiffness and higher density than normal, because one suitable way of making such polythenes is to operate the polymerisation reaction at lower temperatures than those normally employed, and the catalysts are sufficiently active to enable satisfactory reaction rates to be achieved at such lower temperatures. The catalysts may be used in ethylene polymerisation also in the presence of added chain transfer agents for example hydrogen, carbon tetrachloride, chloroform. A suitable proportion of the chain-transfer agent hydrogen is 0.50% to 2.5% by volume of the ethylene measured at atmospheric pressure. A suitable proportion of the chain-transfer agent carbon tetrachloride and chloroform is 0.05% to 1.0% by weight of the ethylene. When using these catalysts in polythene manufacture reaction pressures are generally above 500 atmospheres, preferably between 1000 and 2000 atmospheres. A suitable proportion of catalyst is between 5 and 50 parts per million of ethylene. The choice of reaction temperature in polythene manufacture is governed by whether a high rate of polymerisation at moderately elevated temperature, for example between about 75° C. and 150° C., if desired, or a moderate rate at lower temperatures, for example between about 25° C. and 100° C. The useful range is from about 0° C. to 150° C. and it is very convenient to operate between 15° C. and 125° C.

The invention is illustrated but not limited by the following examples in which parts and percentages are by weight. Detailed recipes for the manufacture of the hyponitrites used in the examples are provided in our U.S. application, Serial No. 655,478, filed April 29, 1957, now U.S. Patent 2,913,481.

EXAMPLE 1

100 parts of vinyl acetate are mixed at 0° C. with 1 part of a 9.8% solution of bis-methoxymethyl hyponitrite in white spirit. Nitrogen is bubbled through the mixture at 0° C. to remove oxygen and the temperature is then raised to 40° C. After 5 minutes the mixture has become quite viscous and after 15 minutes has set to a highly viscous mass. The conversion to solid polymer is 90%.

EXAMPLE 2

100 parts of vinyl acetate and 1 part of a 10% solution of bis-tetrahydropyranyl hyponitrite in the diethyl ether of diethylene glycol are mixed together at 0° C. and nitrogen is bubbled through the solution. The temperature is then raised to 40° C. when polymerisation took place as in Example 1.

EXAMPLE 3

100 parts of vinyl acetate are suspended in 100 parts of water at 0° C. to which has been added 1 part of a 15% solution of bis-methoxymethyl hyponitrite in the diethyl ether of diethylene glycol also at 0° C. Oxygen is removed from the system by bubbling nitrogen through the suspension at 0° C. The mixture is agitated and the temperature is raised to 30° C. After 20 minutes the polymer is separated and is found to have a solid content corresponding to 88% conversion.

EXAMPLE 4

An autoclave equipped with stirrer is cooled to −80° C. and to it is added 1 part of a 2.9% solution of bis-methoxymethyl hyponitrite in white spirit. The autoclave is sealed and ethylene is admitted to a few atmospheres pressure and then released. This purge is repeated twice and then ethylene is admitted to 600 atmospheres pressure and the stirrer is started. The vessel is warmed to 21° C. and the ethylene pressure is raised to 1000 atm. Reaction, indicated by a fall in pressure, begins and the pressure is restored to 1000 atm. by admission of further ethylene. After 1 hour 14 minutes, when ethylene equivalent to 100 atms. has been added, the pressure is released and the vessel is opened.

5.2 parts of a white solid polymer of ethylene are found in the vessel. The polymer is purified by dissolving it in 20 times its weight of boiling xylene, filtering the hot solution, and precipitating the polymer by means of a large excess of methanol. The polymer is dried in vacuo after filtration. It has a melt index of 0.0015 and a density of 0.9441; a Vicat softening point of 117.5° C.; is 70% crystalline; and has an ultimate tensile strength of 232 kg./cm.$^2$ at an extension of 290%. When for comparison 5% of isopropyl hyponitrite is used as initiator a temperature of 50° C. is required in order that 3.6 parts of polymer may be produced in 2 hours.

EXAMPLE 5

When, similarly, 1 part of a 2.5% solution of bis-isobutoxymethyl hyponitrite in low boiling petroleum ether is used as initiator at 20° C., and a pressure of 1600 atm. ethylene, 6.5 parts of a solid polymer are produced in 42 minutes. This polymer has a melt index of 0.00082; a density of 0.9416; a Vicat softening point of 119° C. and a crystallinity of 72%. When for comparison isobutyl hyponitrite is used under similar conditions as initiator, only 0.6 part of polymer is obtained.

EXAMPLE 6

In a similar manner the reaction is carried out at 30° C. and 1400 atm., using 0.5 part of a 4% solution of bis-isobutoxymethyl hyponitrite in the diethyl ether of diethylene glycol as initiator, but with the further addition of 1 part of a 5% solution of chloroform in light petroleum ether.

5 parts of a solid polymer of ethylene are produced in 46 minutes. This polymer has a melt index of 0.45; a density of 0.956, and an ultimate tensile strength of 236 kg./cm.$^2$. When for comparison isobutyl hyponitrite is used under similar conditions as initiator, 5 hours are required to produce a similar yield of polymer.

EXAMPLE 7

Under similar conditions to those of Example 6 but with 0.75 part of a 5% solution of carbon tetrachloride dissolved in light petroleum as transfer agent instead of chloroform, 5.6 parts of polymer are produced in 54 minutes. The melt index is 0.84; the density 0.952; and the ultimate tensile strength 244 kg./cm.$^2$.

EXAMPLE 8

The reaction is carried out with 1.25 parts of a 2.5% solution of methoxymethylhyponitrite in white spirit as initiator at 20° C., 1400 atm., and with the addition of hydrogen to 12 atmospheres pressure before addition of the ethylene; 5.8 parts of product are produced in 1 hour 40 minutes. The melt index is 1.5; the density 0.96; the Vicat softening point 120.5° C.; the crystallinity 74% and the ultimate tensile strength 230 kg./cm.$^2$. When for comparison ethyl hyponitrite is used under similar conditions over 5 hours are needed to give a similar yield of polymer.

EXAMPLE 9

When Example 8 is repeated at 8° C. with 2.0 parts of initiator solution and 6 atmospheres of hydrogen, 2.7 parts of product are produced in 3 hours 20 minutes, having a melt index 0.027; a density of 0.950; and an ultimate tensile strength of 270 kg./cm.$^2$. When for comparison ethyl hyponitrite is used under similar conditions, a negligible yield of polymer is obtained in 5 hours.

EXAMPLE 10

When 1 part of a 3% solution of bis-cyclohexyloxymethyl hyponitrite in white spirit is used as initiator at 21° C. and 1000 atm. ethylene pressure, 4.5 parts of product are produced in 3½ hours, and the polymer is 70% crystalline and has a melt index of 0.034. When for comparison isopropyl hyponitrite is used under similar conditions, a negligible yield of polymer is obtained in 5 hours.

EXAMPLE 11

100 parts of vinyl acetate and 2 parts of a 5% solution of an alkoxyalkyl hyponitrite in toluene are mixed together at −15° C. and nitrogen bubbled through the mixture for 15 minutes. The temperature is then raised to the temperature at which the polymerisation is to be carried out. The results for a number of hyponitrites are summarised in Table 1.

Table 1

| Catalyst | Parts of catalyst per 100 parts of vinyl acetate | Temperature, °C. | Time, hours | Yield of polymers (parts) |
|---|---|---|---|---|
| Bis-ethoxymethyl hyponitrite | 0.1 | 40 | ½ | 90 |
| β-ethoxymethyl hyponitrite | 0.1 | 25 | 3½ | 96 |
| β-isopropoxymethyl hyponitrite | 0.1 | 40 | ½ | 88 |
| Bis-2-tetrahydrofuranyl hyponitrite | 0.02 | 40 | ¾ | 55 |
| Bis-3-chloro-2-tetrahydrofuranyl hyponitrite | 0.05 | 40 | 1 | 50 |
| Bis-α-methoxy-benzyl hyponitrite | 0.05 | 40 | 1 | 65 |
| Bis-α-ethoxy-α-cyclohexyl-methyl hyponitrite | 0.05 | 40 | ½ | 92 |
| Bis-phenoxymethyl hyponitrite | 0.1 | 40 | 1 | 72 |
| Bis-chloromethoxymethylhyponitrite | 0.1 | 25 | ½ | 87 |
| Poly-1:2-aza-3:5:7-oxaheptane | 0.1 | 25 | ½ | 92 |

EXAMPLE 12

The conditions of Example 11 are repeated using methyl methacrylate in place of vinyl acetate. The results for a number of catalysts are summarised in Table 2.

Table 2

| Catalyst | Parts of catalyst per 100 parts of methyl methacrylate | Temperature, °C. | Time, hours | Yield of polymer (parts) |
|---|---|---|---|---|
| Bis-methoxy-methyl hyponitrite | 0.1 | 40 | 1 | 75 |
| Bis-3-chloro-2-tetrahydrofuranyl hyponitrite | 0.05 | 40 | ¼ | 87 |
| Bis-2-tetrahydrofurfuryl hyponitrite | 0.02 | 40 | ¾ | 80 |
| Bis-α-methoxybenzyl hyponitrite | 0.05 | 40 | 2 | 25 |
| Bis-α-ethoxy-α-cyclohexyl methyl hyponitrite | 0.05 | 40 | ½ | 72 |
| Bis-phenoxymethyl hyponitrite | 0.1 | 40 | 2 | 60 |
| Bis-chloromethoxymethyl hyponitrite | 0.1 | 25 | ½ | 68 |
| Poly-1:2-aza-3:5:7-oxaheptane | 0.1 | 25 | ½ | 74 |

EXAMPLE 13

The conditions of Example 11 are repeated using acrylonitrile instead of vinyl acetate. Efficient cooling is necessary during the polymerisation. The results for a number of catalysts are summarised in Table 3.

Table 3

| Catalyst | Parts of catalyst per 100 parts of acrylonitrile | Temperature, °C. | Time, hours | Yield of polymer (parts) |
|---|---|---|---|---|
| Bis-methoxymethyl hyponitrite | 0.1 | 25 | ½ | 96 |
| Bis-2-tetrahydrofuranyl hyponitrite | 0.02 | 25 | ½ | 94 |
| Bis-3-chloro-2-tetrahydrofuranyl hyponitrite | 0.05 | 25 | ½ | 95 |
| Bis-α-ethoxy-α-cyclohexyl methyl hyponitrite | 0.05 | 25 | ½ | 98 |
| Bis-chloromethoxymethyl hyponitrite | 0.05 | 25 | ¼ | 87 |

EXAMPLE 14

The process of Example 11 is repeated using freshly distilled styrene and bis-methoxymethyl hyponitrite as catalyst. After 3 hours at 40° C. the yield of polystyrene is 45%.

EXAMPLE 15

30 parts of an 88% hydrolysed polyvinyl acetate are dissolved in 300 parts of water by stirring for one hour at 20-25° C. and one hour at 80-85° C. The solution is cooled to 20° C. and a solution of 2.4 parts of sodium carbonate in 90 parts of water is added to it. Uniform additions are then made to the 88% polyvinyl alcohol-sodium carbonate of catalyst solution and vinyl acetate as follows:

(1) 432 parts of vinyl acetate at an addition rate of 21.6 parts during 10 minutes.

(2) 16 parts of a 5.5% solution of methoxymethyl hyponitrite in diethylene glycol diethyl ether at an addition rate of 4 parts during 50 minutes. The polymerising mixture shows an exothermic reaction and this is controlled at a temperature range of 20-30° C. by ice-water cooling. When the vinyl acetate and catalyst solution additions are completed the total reaction mixture is stirred at 20-30° C. to ensure complete polymerisation. The polymer dispersion is obtained in 855 parts and has a solids content of 44.65%. A solution of 8.1 parts of polymer in a mixture of 37.8 parts of water and 54 parts of ethyl alcohol has a viscosity of 160 centipoises at 25° C. The polymer dispersion is suitable for the treatment of textiles.

EXAMPLE 16

10 parts of starch methyl ether (sold under the name Solvitose H4) and 7.5 parts of an 88% hydrolysed polyvinyl acetate are dissolved in 162 parts of water by stirring for one hour at 20°-25° C. and one hour at 80°-85° C. The solution is cooled to 20° C. and a solution of 1 part of sodium carbonate in 55 parts of water is added. To this solution the following are added:

(1a) 236 parts of vinyl acetate at an addition rate of 11.8 parts in 10 minutes.

(1b) 22 parts of a 5.5% solution of methoxymethyl hyponitrite at an addition rate of 5½ parts per 50 minutes.

An immediate exothermic action occurs and is controlled by ice-water cooling between the temperature range of 20°-30° C. When the vinyl acetate and catalyst solution additions are complete the polymerisation mixture is stirred at 20°-30° C. to ensure complete polymerisation. The product is obtained as an aqueous dispersion in 487 parts having a solids content of 49%. A solution of 8.1 parts of polymer in a mixture of 37.8 parts of water and 54 parts of ethyl alcohol has a viscosity at 25° C. of 31.35 centipoises. The polymer dispersion is suitable for use as a water paint.

EXAMPLE 17

1 part of pure recrystallised cyclohexyloxymethyl hyponitrite is charged to a pressure vessel and 20 parts of solvent are added. The vessel is purged, and ethylene polymerisations are carried out at 20° C. and 1000 atm. pressure with the results indicated in Table 4.

Table 4

| Solvent: | Polymerisation rate pts./hr. |
|---|---|
| None | 26 |
| Ethyl acetate | 12 |
| Dimethyl formamide | 44 |
| Diethyl ether of diethylene glycol | 34 |
| Diethyl oxalate | 32 |
| Methyl isobutyl ketone | 18 |
| Tetrahydrofuran | 30 |
| 4-methylmorpholine | 148[1] |

[1] Reaction temperature 40° C.

EXAMPLE 18

Similar polymerisations to Example 17 are carried out with 1 part of pure recrystallised tetrahydropyranyl hyponitrite.

Table 5

| Solvent: | Polymerisation rate pts./hr. |
|---|---|
| None | 46 |
| Diethyl-2-methylmalonate | 20 |
| Diethyl ether of diethylene glycol | 26 |
| Dimethyl formamide | 32 |

EXAMPLE 19

Example 4 is repeated with 5 parts of pure dodecyloxymethyl hyponitrite. In 2 hours the pressure has fallen by 85 atm. and the yield is 250 parts of tough ethylene polymer.

EXAMPLE 20

0.5 part of a solution obtained by reaction of 6.47 parts of sec-octylchloromethyl ether with 5.5 parts of silver hyponitrite in 40 parts of white spirit followed by filtration and washing of the silver residues twice with 5 parts of white spirit which is added to the main bulk is used similarly. 3.7 parts of ethylene polymer are obtained in 252 minutes.

EXAMPLE 21

Similarly to Example 20 0.5 part of a solution obtained by reaction of 4.95 parts of isoamyloxymethyl chloride, and 6.5 parts of silver hyponitrite in a total quantity of 50 parts of white spirit is used at 30° C. and 1000 atm. pressure of ethylene. 4.6 parts of solid ethylene polymer are obtained in 2 hours.

EXAMPLE 22

A high pressure autoclave is charged with 1 part of a 10% solution in petroleum ether of 1:3-dimethylbutyloxymethyl hyponitrite and 1 part of vinyl phthalimide in 5 parts of benzene. After reaction at 30° C. at 1500 atm. pressure of ethylene for 4½ hours, 3.8 parts of a white tough solid interpolymer are obtained. The polymer is purified by solution in benzene and precipitation in excess methanol after which it is extracted for 16 hours with boiling ethanol. The dried pure interpolymer contains 1.3% N and is hence an interpolymer of ethylene and N-vinylphthalimide of molar composition 10/1.

EXAMPLE 23

When similarly to Example 22 1 part of a 5% solution of α-isobutoxyethyl hyponitrite in white spirit is used at 50° C. and 1500 atm. ethylene pressure, the yield of interpolymer is 1 part in 3 hours.

EXAMPLE 24

Similarly to Example 22 1 part of a 5% solution of isobutoxymethyl hyponitrite in white spirit is used at 30° C. and 1000 atm. ethylene pressure with the addition of 2 parts of pure propylene. 3.1 parts of polymer are obtained in 5 hours. The polymer has a melt index of 0.9, a density of 0.94 gm./cc. and a Vicat softening point of 109.5° C.

EXAMPLE 25

Example 5 is repeated with 1 part of a 5% solution of isobutoxymethyl hyponitrite at 40° C. and 500 atm. ethylene pressure; 2.6 parts of polymer are obtained in 3 hours 20 minutes. The polymer has a melt index of 2.6, a density of 0.95 gm./cc. and a Vicat softening point of 115° C.

EXAMPLE 26

Similarly to Example 25 when 0.5 part of a 10% of 1:3-dimethylbutyloxymethyl hyponitrite in white spirit is used at 0° C. and 2000 atm. ethylene pressure, 1.7 parts of extremely tough hard polymer of ethylene are obtained in 17 hours.

EXAMPLE 27

Into a high pressure reactor cooled to −70° C. are introduced 2½ parts of a solution in white spirit containing 11% by weight of 3:5:5-trimethylhexyloxymethyl hyponitrite. The reactor is closed and the air contained therein is expelled by repeated displacement with compressed ethylene containing less than 10 parts per million of oxygen. Finally the reactor is charged with compressed ethylene to 900 atmospheres and warmed to a constant temperature of 20° C. When the reaction temperature is attained more ethylene is admitted to give a pressure of 1000 atmospheres. The contents of the reactor are continuously stirred and after an induction period of one half to one hour, the pressure of the contained gas begins to decrease. Fresh ethylene is admitted so as to maintain the pressure at 1000 atmospheres. When the total drop in pressure equals 100 atmospheres, the reaction is stopped by releasing the gas remaining in the reactor which is opened and found to contain 51 parts of white solid polymeric material which is identified by its infra-red spectrum and physical properties as polyethylene.

EXAMPLE 28

To a high pressure autoclave are added 50 parts of finely powdered silver hyponitrite and 12 parts of pure chloromethyl ether sealed in an evacuated glass phial. The vessel is evacuated and cooled to −50° C. when it is purged three times with ethylene. Ethylene is admitted to 1000 atm. pressure and the phial is broken by starting the stirrer. After 1 hour at −50° C., the vessel is allowed to warm over a further hour to −20° C. when the pressure reaches 1100 atm. In 5 hours at −20° C. the pressure falls by 60 atm. and after releasing the pressure 210 parts solid material are found in the vessel. The solid is boiled twice with 10 N hydrochloric acid and then three times with concentrated aqueous ammonia. The solid is then dried and extracted at the boiling point with xylene. Purified polyethylene is precipitated from the xylene extracts by addition of a large excess of methanol. After filtration and drying, 120 parts of purified ethylene polymer are recovered of density 0.97 gm./cc.

EXAMPLE 29

0.5 part of a 9.1% solution of β-ethoxyethoxymethyl hyponitrite in diethyloxalate under 1000 atm. of ethylene pressure at 30° C. produces 4.6 parts of polyethylene in 50 minutes.

EXAMPLE 30

0.2 part of an oil obtained by reaction of ethylorthoacetate with silver hyponitrite and anhydrous hydrogen chloride in ether solution and having the properties expected of an impure sample of α:α:α':α'-tetraethoxyethyl hyponitrite promotes the polymerisation of ethylene at 80° C. and 1000 atm. to the extent of 9 parts polyethylene/hr.

A solution of hyponitrous acid in ether/diethyloxalate mixture or in dimethyl formamide does not promote the polymerisation of ethylene under similar conditions.

EXAMPLE 31

Methoxymethyl hyponitrite is manufactured by reaction of 265 parts silver hyponitrite and 53 parts of chloromethyl ether in the presence of 40,000 parts of liquid ethylene at −50° C. and 160 atm. for 4 hours. The liquid ethylene is decanted from the solid residues by means of a stand-pipe and the reaction vessel is flushed with a further 80,000 parts of ethylene. The accumulated liquid ethylene is stored at −5° C. When this ethylene is admixed with further ethylene to a total of approximately 1,000,000 parts and the whole is brought to a pressure of 1500 atm. and a temperature of 19° C., polymerisation of the ethylene ensues at a rate of approximately 20,000 parts/hr.

EXAMPLE 32

1.5 parts of a 3.3% solution of isobutoxymethyl hyponitrite in white spirit, made from copper hyponitrite are placed in a high pressure reactor cooled to −70° C. The enclosed air is removed and the reactor is filled with ethylene containing less than 10 parts per million of oxygen, compressed to 900 atmospheres. The reactor is warmed up to, and maintained at, 30° C., and more ethylene is added to maintain the pressure at 1000 atmospheres. When the pressure of the contained gas has fallen by 100 atmospheres, the reactor is re-opened and found to contain 5.4 parts of tough white polymer.

EXAMPLE 33

Similarly to Example 32, when 2 parts of a 0.8% solution of isobutoxymethyl hyponitrite are used, 3.0 parts of polymer are obtained.

EXAMPLE 34

Similarly to Example 32, when 2 parts of a 2.7% solution of isobutoxymethyl hyponitrite are used, 3.8 parts of polymer are obtained.

EXAMPLE 35

Similarly to Example 32, when 3 parts of a 1.0% isobutoxymethyl hyponitrite solution made from cobalt hyponitrite are used, 5.0 parts of polymer are obtained.

EXAMPLE 36

Similarly to Example 32, when 3 parts of 1.1% isobutoxymethyl hyptonitrite solution made from manganese hyponitrite are used, 2.0 parts of polymer are obtained.

EXAMPLE 37

Into a stainless steel autoclave fitted with a paddle stirrer are charged 4 parts of potassium oleic soap, 2 parts of sodium dinaphthylmethane disulphonate, 3.7 parts of dodecyl mercaptan and 3 parts of potassium chloride in 1650 parts of water. The temperature of the mixture is reduced to 10° C. with cold running water and 2 parts of methoxymethyl hyponitrite as a 10% solution in the diethyl ether of ethylene glycol are added. The autoclave is evacuated, purged with nitrogen and evacuated once more. 670 parts of butadiene and 330 parts of acrylonitrile are added and the temperature is raised as rapidly as possible to 30° C. with stirring. The course of the reaction is followed by taking samples of the reaction mixture and determining total solids. The results are summarised in Table 6.

EXAMPLE 38

The conditions of Example 37 are repeated except that the reaction temperature is 25° C. instead of 30° C. The results are summarised in Table 6.

EXAMPLE 39

The conditions of Example 37 are repeated except that 20 parts of potash oleic soap are used and the sodium dinaphthylmethane disulphonate is replaced by 1.3 parts of Turkey Red Oil which is added at 30% conversion. The results are summarised in Table 6.

EXAMPLE 40

100 parts of vinyl chloride and 0.1 part of methoxymethyl hyponitrite (as a 10% solution in diethylene glycol diethyl ether) are cooled in a tube at −80° C., the tube is then evacuated and sealed. The tube is then transferred to a water bath at 30° C. After 2 hours the contents of the tube are completely solid.

EXAMPLE 41

Granular polymerisations are performed in sealed tubes as follows:

Vinyl chloride _____ parts__ 30
Distilled water _____ do__ 60
Polyvinyl alcohol _____ do__ 0.12
Methoxymethyl hyponitrite _____ varied
(5% w./v. solution in diethyl carbitol)

0.2 part of polyvinyl alcohol dissolved in 60 parts of water and a 5% solution of methoxymethyl hyponitrite in the diethyl ether of ethylene glycol are placed in a tube from which air has been displaced by nitrogen and cooled to −80° C. 30 parts of vinyl chloride are then added. After sealing, the tube is transferred to a water bath at 30° C., in which it is rotated at 25 r.p.m. After 4 hours the tube is opened and the polymer is filtered, dried and weighed.

Catalyst conventration
 (% on monomer):                   Percent conversion
 0.1 _____ 40
 0.3 _____ 100

EXAMPLE 42

Distilled water (200 parts), polyvinyl alcohol (0.4 part) and methoxymethyl hyponitrite (0.2 part) as a 5% solution in the diethyl ether of ethylene glycol are introduced into a stainless steel autoclave fitted with a stirrer and heating jacket. The vessel is evacuated to a residual air pressure of 4½ inches of mercury and then purged with nitrogen to remove the residual air. Vinyl chloride (100 parts) is blown into the autoclave under nitrogen pressure. The contents of the autoclave are heated to 30° C. with stirring, and are maintained at this temperature for 5½ hours. Residual vinyl chloride is then vented and the polymer isolated by filtration. The yield is 82% of the monomer charged.

What we claim is:

1. Process for the polymerization of a compound containing the group $>C=CH_2$ which comprises polymerizing said compound in the presence of a catalytic amount of a hyponitrite selected from the group consisting of esters having the formula $$X-O-CYY'-O-N=N-O-CY'Y-O-X$$

wherein X is selected from the group consisting of alkyl, alkoxyalkyl, cycloalkyl, aryl and a divalent hydrocarbon radical forming part of a ring that also includes O and Y, Y is selected from the group consisting of hydrogen, alkyl, alkoxyalkyl, cycloalkyl, aryl, alkoxy and a divalent hydrocarbon radical forming part of a ring that also includes O and X, and Y' is selected from the group consisting of hydrogen and lower alkyl, and polymeric esters of hyponitrous acid prepared by reaction of a metal hyponitrite and a compound having the formula $$Hal-R-Hal$$

*Table 6*

| Example No. | Reaction Temperature, degrees | Parts catalyst per 100 parts monomer | Percent Conversion in x hours | | | | | | | | | | | Percent Combined Polyacrylonitrile |
|---|---|---|---|---|---|---|---|---|---|---|---|---|---|---|
| | | | x | 2 | 4 | 6 | 8 | 10 | 12 | 20 | 24 | 30 | 36 | |
| 37 | 30 | 0.2 | | 5.0 | 6.3 | 14.2 | 16.6 | 16.0 | 17.0 | 17.5 | | | | 34.2 |
| 38 | 25 | 0.2 | | 7.4 | 9.4 | 10.7 | 11.6 | 13.3 | 15.2 | 17.5 | 17.9 | | | 30.8 |
| 39 | 25 | 0.4 | | | 9.8 | 16.7 | 27.5 | 30.4 | 32.0 | 49.7 | 49.26 | 58.96 | 60.4 | | in which R represents an X—O—CY'Y group at a temperature between about −20° C. and 10° C.

2. Process as claimed in claim 1 wherein the hyponitrite contains the structure $$R''-O-CH_2-O-N=N-O-CH_2O-R''$$

wherein R'' stands for a member of the group consisting of ethyl, n- and isopropyl, n- iso- and sec-butyl, iso-amyl, n- and sec-octyl, 2:4:4-trimethylpentan-2-yl, 3:5:5-trimethylhexan-1-yl, dodecyl, and cyclohexyl.

3. Process as claimed in claim 1 wherein the hyponitrite used is bis-methoxymethyl hyponitrite.

4. Process as claimed in claim 1 wherein the hyponitrite is obtained from bis(halogenomethyl)ether and silver hyponitrite.

5. Process as claimed in claim 1 wherein the hyponitrite is prepared in the presence of the monomer to be polymerised and the system is then allowed to warm up to reaction temperature.

6. Process as claimed in claim 5 wherein the hyponitrite is prepared from an unstable halide.

7. Process as claimed in claim 1 wherein the ethylenically unsaturated compound is ethylene and the polymerisation is performed at a pressure greater than about 500 atmospheres and at a temperature below about 150° C.

8. Process for the polymerisation of ethylene as claimed in claim 7 wherein the pressure is between 1000 and 2000 atmospheres and the temperature is between 15° C. and 125° C.

9. Process for the polymerisation of ethylene as claimed in claim 7 wherein a chain transfer agent is present along with the ethylene.

10. Process for the polymerisation of ethylene as claimed in claim 9 wherein hydrogen in an amount between 0.50 and 2.5% by volume of the ethylene measured at atmospheric pressure is present as chain transfer agent.

11. Process for the polymerisation of ethylene as claimed in claim 9 wherein carbon tetrachloride in an amount of between 0.01% and 1.0% by weight of the ethylene is present as chain transfer agent.

References Cited in the file of this patent

UNITED STATES PATENTS 2,758,107　　Heiligmann et al. _____ Aug. 7, 1956

FOREIGN PATENTS 618,168　　Great Britain _____ Feb. 7, 1949

OTHER REFERENCES

Annalen der Chemie, pages 292, 329 (1896).
Journal of the Chem. Soc., page 2593 (1932).